United States Patent
Turtinen et al.

(10) Patent No.: US 11,997,605 B2
(45) Date of Patent: May 28, 2024

(54) UPLINK INFORMATION BASED ON WAKE-UP SIGNAL

(71) Applicant: Nokia Technologies Oy, Espoo (FI)

(72) Inventors: Samuli Turtinen, Ii (FI); Chunli Wu, Beijing (CN); Jussi-Pekka Koskinen, Oulu (FI); Jorma Kaikkonen, Oulu (FI); Timo Koskela, Oulu (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/168,270

(22) Filed: Feb. 5, 2021

(65) Prior Publication Data
US 2021/0250865 A1    Aug. 12, 2021

(30) Foreign Application Priority Data

Feb. 6, 2020  (WO) ................ PCT/CN2020/074452

(51) Int. Cl.
*H04W 52/02*  (2009.01)
*H04W 72/23*  (2023.01)
*H04W 76/28*  (2018.01)

(52) U.S. Cl.
CPC ....... *H04W 52/0235* (2013.01); *H04W 72/23* (2023.01); *H04W 76/28* (2018.02)

(58) Field of Classification Search
CPC ........... H04W 52/0235; H04W 72/042; H04W 76/28; H04W 52/0216; H04W 52/0225; H04W 52/0229; H04W 72/04; H04W 52/0248; H04W 72/23; H04W 24/08; H04W 24/10; H04W 72/21; Y02D 30/70
See application file for complete search history.

(56) References Cited

U.S. PATENT DOCUMENTS

| 2019/0254110 A1 | 8/2019 | He et al. |
| 2020/0029302 A1 | 1/2020 | Cox et al. |
| 2020/0107266 A1* | 4/2020 | Liao ................. H04W 52/0229 |

(Continued)

FOREIGN PATENT DOCUMENTS

| CN | 101651530 A | 2/2010 |
| CN | 103037481 A * | 4/2013 |

(Continued)

OTHER PUBLICATIONS

Shi, "Method for Monitoring Wake-Up Signal, Electronic Device, and Storage Medium", May 14, 2021, WO, English translation of WO 2021087675 (Year: 2021).*

(Continued)

*Primary Examiner* — Michael K Phillips
(74) *Attorney, Agent, or Firm* — ALSTON & BIRD LLP

(57) ABSTRACT

Embodiments of the present disclosure relate to uplink control information for uplink information based on wake-up signals. According to embodiments of the present disclosure, the terminal device determines based on transmission information at a first time point whether a predetermined number of the one or more occasions overlaps with active time of the terminal device. The terminal device determines the configuration for transmitting the uplink information based on the determination. In this way, ambiguity has been reduced and the flexibility of the network is improved.

18 Claims, 8 Drawing Sheets

(56) References Cited

U.S. PATENT DOCUMENTS

| | | | |
|---|---|---|---|
| 2020/0145921 A1 | 5/2020 | Zhang et al. | |
| 2021/0084586 A1* | 3/2021 | Loehr | H04W 52/0216 |
| 2021/0105722 A1* | 4/2021 | Tsai | H04W 72/042 |
| 2022/0039009 A1* | 2/2022 | Iyer | H04W 72/044 |
| 2022/0110054 A1* | 4/2022 | Seo | H04L 5/0094 |
| 2022/0150836 A1* | 5/2022 | Seo | H04L 5/001 |
| 2022/0264460 A1* | 8/2022 | Seo | H04W 52/0232 |

FOREIGN PATENT DOCUMENTS

| | | | | |
|---|---|---|---|---|
| CN | 103037481 A | | 4/2013 | |
| CN | 107431982 A | | 12/2017 | |
| CN | 110463285 A | | 11/2019 | |
| CN | 110754117 A | | 2/2020 | |
| CN | 111586812 B | * | 8/2023 | H04W 52/0229 |
| WO | 2018/212867 A1 | | 11/2018 | |
| WO | 2019/033017 A1 | | 2/2019 | |
| WO | 2020/223966 A1 | | 11/2020 | |
| WO | WO-2021068173 A1 | * | 4/2021 | |
| WO | WO-2021087675 A1 | * | 5/2021 | |

OTHER PUBLICATIONS

Shi, "Signal Transmission Method and Apparatus, and Terminal Device", Apr. 15, 2021, WO, English translation of WO 2021068173. (Year: 2021).*

ZTE, "A Method and Device for Realizing Non-Continuous Transceiver", Apr. 10, 2013, CN, English translation of CN 103037481. (Year: 2013).*

Liu et al., "Method for receiving energy-saving signal by terminal and terminal", CN, Aug. 25, 2023, English translation of CN 111586812 (Year: 2023).*

Nokia et al., "Further details on PDCCH WUS", Nov. 18-22, 2019, 3GPP TSG-RAN WG2 Meeting #108, Reno, R2-1915520 (Year: 2019).*

"New WID: UE Power Saving in NR", 3GPP TSG RAN Meetings #84, RP-191607, Agenda: 9.4.6, CATT, Jun. 3-6, 2019, 5 pages.

"Stage-2 running CR for Support of UE Power Saving in NR", 3GPP TSG-RAN WG2 Meeting #109, R2-20xxxxx, CATT, Feb. 14-28, 2020, 24 pages.

"LS reply on CSI/SRS Reporting", 3GPP TSG-RAN WG1#99, R1-1913480, RAN WG1, Nov. 18-22, 2019, 1 page.

"LS to RAN1 on CSI/SRS Reporting", 3GPP TSG-RAN WG2 Meeting #107bis, R2-1914200, RAN2, Oct. 14-18, 2019, 1 page.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Physical layer procedures for data (Release 16)", 3GPP TS 38.214, V16.0.0, Dec. 2019, pp. 1-148.

"3rd Generation Partnership Project; Technical Specification Group Radio Access Network; NR; Physical layer procedures for control (Release 16)", 3GPP TS 38.213, V16.0.0, Dec. 2019, pp. 1-146.

"Handling of the DRX Ambiguous Period", 3GPP TSG-RAN WG2#101, R2-1802147, CATT, Agenda Item: 10.3.1.10, Feb. 26-Mar. 2, 2018, pp. 1-6.

International Search Report and Written Opinion received for corresponding Patent Cooperation Treaty Application No. PCT/CN2020/074452, dated Nov. 17, 2020, 9 pages.

"Further Discussion on UE Behavior Upon Reception of WUS", 3GPP TSG-RAN WG2 Meeting #106, R2-1906703, Qualcomm Inc, Agenda Item: 11.11.4.1, May 13-17, 2019, pp. 1-4.

"PDCCH-based Power Saving Signal/Channel", 3GPP TSG RAN WG1 #97, R1-1906980, Samsung, Agenda Item: 7.2.9.1, May 13-17, 2019, 12 pages.

Extended European Search Report received for corresponding European Patent Application No. 21155347.4, dated Jun. 22, 2021, 10 pages.

"Considerations on PDCCH-based power saving signal", 3GPP TSG-RAN WG1 #98-bis, R1-1910671, Agenda item: 7.2.9.1, Intel Corporation, Oct. 14-20, 2019, 10 pages.

"PDCCH-based power saving channel design", 3GPP TSG-RAN WG1 #99, R1-1912970, Agenda item: 7.2.9.1, Qualcomm Incorporated, Nov. 18-22, 2019, 19 pages.

Office Action for Chinese Application No. 202110163156.1 dated Sep. 28, 2022, 8 pages.

First Examination Report for Indian Application No. 202227050312 dated Jul. 10, 2023, 7 pages.

Notice of Allowance for Chinese Application No. 202110163156.1 dated Aug. 11, 2023, 8 pages.

Office Action for Canadian Application No. 3,167,108 dated Sep. 6, 2023, 4 pages.

Office Action for Chinese Application No. 202110163156.1 dated Jun. 20, 2023, 3 pages.

Decision to Grant for Chinese Application No. 202110163156.1 dated Aug. 11, 2023, 4 pages.

Examination Report for Australian Application No. 2020427124 dated Apr. 28, 2023, 3 pages.

Huawei et al., "WUS Collision With DRX Active Time", 3GPP TSG-RAN WG2 Meeting #107, R2-1911243, (Aug. 26-30, 2019), 7 pages.

Intel Corporation, "Remining Issue in DRX Ambiguous Period", 3GPP TSG-RAN WG2 Meeting #NR AH 1807, R2-1809803, (Jul. 2-6, 2018), 6 pages.

Nokia et al., "Further Details on PDCCH WUS", 3GPP TSG-RAN WG2 Meeting #108, R2-1915520, (Nov. 18-22, 2019), 5 pages.

Office Action for Algerian Application No. DZ/P/2022/000669 dated Jan. 20, 2023, 2 pages.

Office Action for Japanese Application No. 2022-547736 dated Aug. 24, 2023, 9 pages.

OPPO, "Remaining Issues on PDCCH-Based WUS", 3GPP TSG-RAN WG2 Meeting #108, R2-1914394, (Nov. 18-22, 2019), 5 pages.

* cited by examiner

UPLINK INFORMATION BASED ON WAKE-UP SIGNAL

RELATED APPLICATION

This application claims priority from PCT application No. PCT/CN2020/074452 filed on Feb. 6, 2020, which is hereby incorporated in its entirety.

FIELD

Embodiments of the present disclosure generally relate to communication techniques, and more particularly, to methods, devices and computer readable medium for uplink information based on wake-up signals.

BACKGROUND

With development of communication systems, more and more technologies have been proposed. The technology named "wake up signal (WUS)" is under discussion in the power saving work item and discontinuous reception (DRX) has been supported for power saving. WUS is designed to allow the terminal device to skip physical downlink control channel (PDCCH) monitoring for OnDurations when there is no data transmission to be done. If the network device intends to schedule the terminal device, it needs to send wake up signalling to the terminal device during the WUS occasion(s) to wake up the terminal device first, the terminal device will then monitor normal PDCCH for scheduling data at the coming OnDuration.

SUMMARY

Generally, embodiments of the present disclosure relate to a method for uplink information based on wake-up signals and corresponding devices.

In a first aspect, there is provided a method. The method comprises receiving, at a first device and from a second device, information indicating one or more occasions configured for detection of physical downlink control channel (PDCCH) transmission carrying a wake-up indication. The method also comprises determining, based on transmission information available at a first time point, whether a predetermined number of the one or more occasions overlaps with active time t, wherein the predetermined number of the one or more occasions are after the first time point. The method further comprises generating a configuration for transmitting an uplink information based on the determination. The method yet comprises transmitting the uplink information to the second device based on the configuration.

In a second aspect, there is provided a method. The method comprises determining, at a second device, one or more occasions configured for detection of physical downlink control channel (PDCCH) transmission carrying a wake-up indication. The method also comprises transmitting to a first device information indicating the one or more occasions. The method further comprises determining whether the first device is expected to monitor a predetermined number of the one or more occasions based on transmission information available at the first device at a first time point, wherein the predetermined number of the one or more occasions are after the first time point. The method yet comprises receiving uplink information from the first device based on a configuration which is determined based on whether the first device is expected to monitor the predetermined number of the at least one occasion.

In a third aspect, there is provided a first device. The first device comprises at least one processor; and at least one memory including computer program codes; the at least one memory and the computer program codes are configured to, with the at least one processor, cause the first device to receive, from a second device, information indicating one or more occasions configured for detection of physical downlink control channel (PDCCH) transmission carrying a wake-up indication. The first device is also caused to determine, based on transmission information available at a first time point, whether a predetermined number of the one or more occasions overlaps with active time, wherein the predetermined number of the one or more occasions are after the first time point. The first device is further caused to generate a configuration for transmitting uplink information based on the determination. The first device is yet caused to transmit the uplink information to the second device based on the configuration.

In a fourth aspect, there is provided a second device. The second device comprises at least one processor; and at least one memory including computer program codes; the at least one memory and the computer program codes are configured to, with the at least one processor, cause the second device to determine one or more occasions configured for detection of physical downlink control channel (PDCCH) transmission carrying a wake-up indication. The second device is also caused to transmit to a first device information indicating the one or more occasions. The second device is further caused to determine whether the first device is expected to monitor a predetermined number of the one or more occasions based on transmission information available at the first device at a first time point, wherein the predetermined number of the one or more occasions are after the first time point. The second device is yet caused to receive uplink information from the first device based on a configuration which is determined based on whether the first device is expected to monitor the predetermined number of the at least one occasion.

In a fifth aspect, there is provided an apparatus. The apparatus comprises means for receiving, at a first device and from a second device, information indicating one or more occasions configured for detection of physical downlink control channel (PDCCH) transmission carrying a wake-up indication; means for determining, based on transmission information available at a first time point, whether a predetermined number of the one or more occasions overlaps with active time of the first device, wherein the predetermined number of the one or more occasions are after the first time point; and means for transmitting the uplink information to the second device based on the configuration.

In a sixth aspect, there is provided an apparatus. The apparatus comprises means for determining, at a second device, one or more occasions configured for detection of physical downlink control channel (PDCCH) transmission carrying a wake-up indication; means for transmitting to a first device information indicating the one or more occasions; means for determining whether the first device is expected to monitor a predetermined number of the one or more occasions based on transmission information available at the first device at a first time point, wherein the predetermined number of the one or more occasions are after the first time point; and means for receiving uplink information from the first device based on a configuration which is determined based on whether the first device is expected to monitor the predetermined number of the at least one occasion.

In a seventh aspect, there is provided a computer readable medium comprising program instructions for causing an apparatus to perform at least the method according to the above first or second aspect.

In an eighth aspect, there is provided a computer program product that is stored on a computer readable medium and includes machine-executable instructions, wherein the machine-executable instructions, when being executed, cause the machine to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
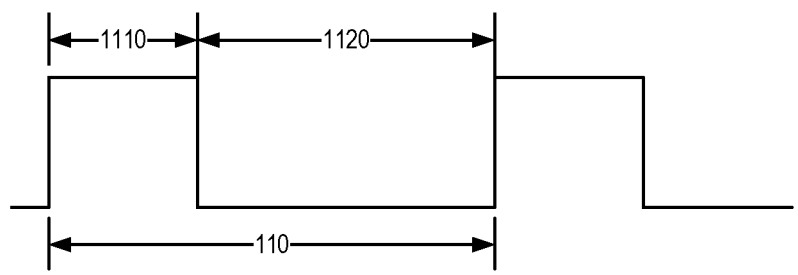
FIG. 1 illustrates a schematic diagram of a discontinuous reception (DRX) cycle according to conventional technologies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, Integrated Access and Backhaul (IAB) node, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As discussed above, the WUS is designed to allow the terminal device to skip physical downlink control channel (PDCCH) monitoring for OnDurations when there is no data transmission to be done. If the network device intends to schedule the terminal device, it needs to send wake up signalling to the terminal device during the WUS occasion(s) to wake up the terminal device first, the terminal device will then monitor normal PDCCH for scheduling data at the coming OnDuration. WUS is called DCP (downlink control information (DCI) with cyclic redundancy check (CRC) scrambled by power saving radio network temporary identity (PS-RNTI)) in the third generation partnership project (3GPP). The network device can configure if the terminal device sends periodic channel state information (CSI) feedback and/or L1-reference signal received power (RSRP) feedback even in case drx-onDurationTimer is not started by the WUS/DCP, for instance, when the UE does not detect any WUS/DCP that would require the UE to wake up and start the drx-onDurationtimer.

The PDCCH monitoring activity of the terminal device in radio resource control (RRC) connected mode is governed by DRX, bandwidth adaption (BA), and DCP. FIG. 1 illustrates a schematic diagram of a discontinuous reception (DRX) cycle according to conventional technologies. As shown in FIG. 1, there are an OnDuration 1110 and a duration 1120 for opportunity for DRX in one DRX cycle 110. Detailed explanation of FIG. 1 is described below.

When DRX is configured, the terminal device does not have to continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

When BA is configured, the UE only has to monitor PDCCH on the one active BWP i.e. it does not have to monitor PDCCH on the entire downlink (DL) frequency of the cell. A BWP inactivity timer (independent from the DRX inactivity-timer described above) is used to switch the active BWP to the default one: the timer is restarted upon successful PDCCH decoding and the switch to the default BWP takes place when it expires.

In addition, the UE may be indicated, when configured accordingly, whether it is required to monitor or not the PDCCH during the next occurrence of the on-duration by a DCP received on the active BWP. By default, if it does not detect a DCP on the active BWP, the UE does not monitor the PDCCH during the next occurrence of the on-duration. However, it can also be configured to have the opposite behavior in this case, i.e. monitor the PDCCH during the next occurrence of the on-duration.

A UE can only be configured to monitor DCP when connected mode DRX is configured, and at occasion(s) at a configured offset before the on-duration. More than one monitoring occasion can be configured before the on-duration. The UE does not monitor DCP on occasions occurring during active-time, measurement gaps, or BWP switching, in which case it monitors the PDCCH during the next on-duration. If no DCP is configured in the active BWP, UE follows normal DRX operation.

When CA is configured, DCP is only configured on the PCell or PSCell (Primary Secondary Cell). One DCP can be configured to control PDCCH monitoring during on-duration for one or more UEs independently. Power saving in RRC_IDLE and RRC_INACTIVE can also be achieved by UE relaxing neighbor cells RRM measurements when it meets the criteria determining it is in low mobility or not at cell edge.

UE power saving may be enabled by adapting the DL maximum number of MIMO layers by BWP switching. Power saving is also enabled during active-time via cross-slot scheduling, which facilitates UE to achieve power saving with the assumption that it won't be scheduled to receive PDSCH, triggered to receive A-CSI or transmit a PUSCH scheduled by the PDCCH until the minimum scheduling offsets K0 and K2. Dynamic adaptation of the minimum scheduling offsets K0 and K2 is controlled by PDCCH.

In some situation, for instance, when the network device ends the terminal device's active time, the network device does not know the exact time when the terminal device decoded the medium access control (MAC) control element (CE) (e.g., DRX command MAC CE) and applied it. This means that there is ambiguity in the network device whether the terminal device would be decoding DCP/WUS in case DCP/WUS occasion(s) happen during the ambiguity time between the terminal device and network device. Furthermore, this ambiguity time may overlap with part of the DCP occasions or all of them.

This makes it difficult for the network device to know if the terminal device will report CSI based on the configuration given for the situation when drx-onDurationTimer is not started by DCP or if the terminal device will report the CSI based on the case when drx-onDurationTimer is started by DCP or by the conditions where DCP occasion(s) overlaps with active time.

Based on conventional technologies, the ambiguity period is only applicable to determine possible uplink transmission, but it is not applicable to PDCCH reception, which means the terminal device needs to continue PDCCH reception during the ambiguity period while it does not if the network device wants to stop the active time. It would not be possible also to do that for DCP since the terminal device is not required to be able to simultaneously receive DCP and other PDCCH for scheduling.

According to embodiments of the present disclosure, the terminal device determines based on transmission information at a first time point whether a predetermined number of the one or more occasions overlaps with active time of the terminal device. The terminal device defines or generates the configuration for transmitting the uplink information based on the determination. In this way, ambiguity has been reduced and the flexibility of the network is improved.

Figure 2:
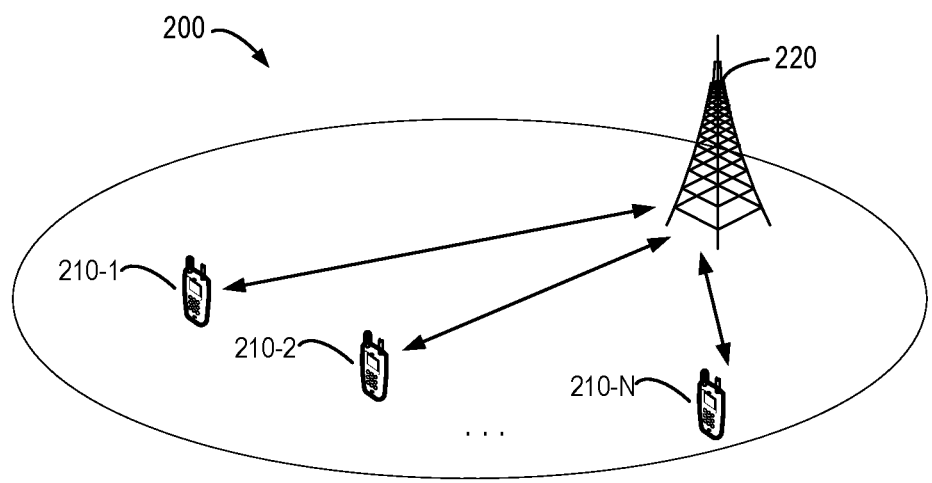
FIG. 2 illustrates a schematic diagram of a communication system according to according to embodiments of the present disclosure.

FIG. 2 illustrates a schematic diagram of a communication system in which embodiments of the present disclosure can be implemented. The communication system 200, which is a part of a communication network, comprises a device 210-1, a device 210-2, . . . , a device 210-N, which can be collectively referred to as "first device(s) 210." The communication system 100 further comprises a second device 220. One or more devices are associated with and covered by a cell. It is to be understood that the number of devices and cells shown in FIG. 2 is given for the purpose of illustration without suggesting any limitations. The communication system 200 may comprise any suitable number of devices and cells. In the communication system 200, the first device 210 and the second device 220 can communicate data and control information to each other. In the case that the first device 110 is the terminal device and the second device 220 is the network device, a link from the second device 220 to the first device 110 is referred to as a downlink (DL), while a link from the first device 110 to the second device 220 is referred to as an uplink (UL). The number of devices shown in FIG. 2 is given for the purpose of illustration without suggesting any limitations. The second device 220 and the third device 130 are interchangeable.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple Access (OFDMA) and/or any other technologies currently known or to be developed in the future.

Figure 3:
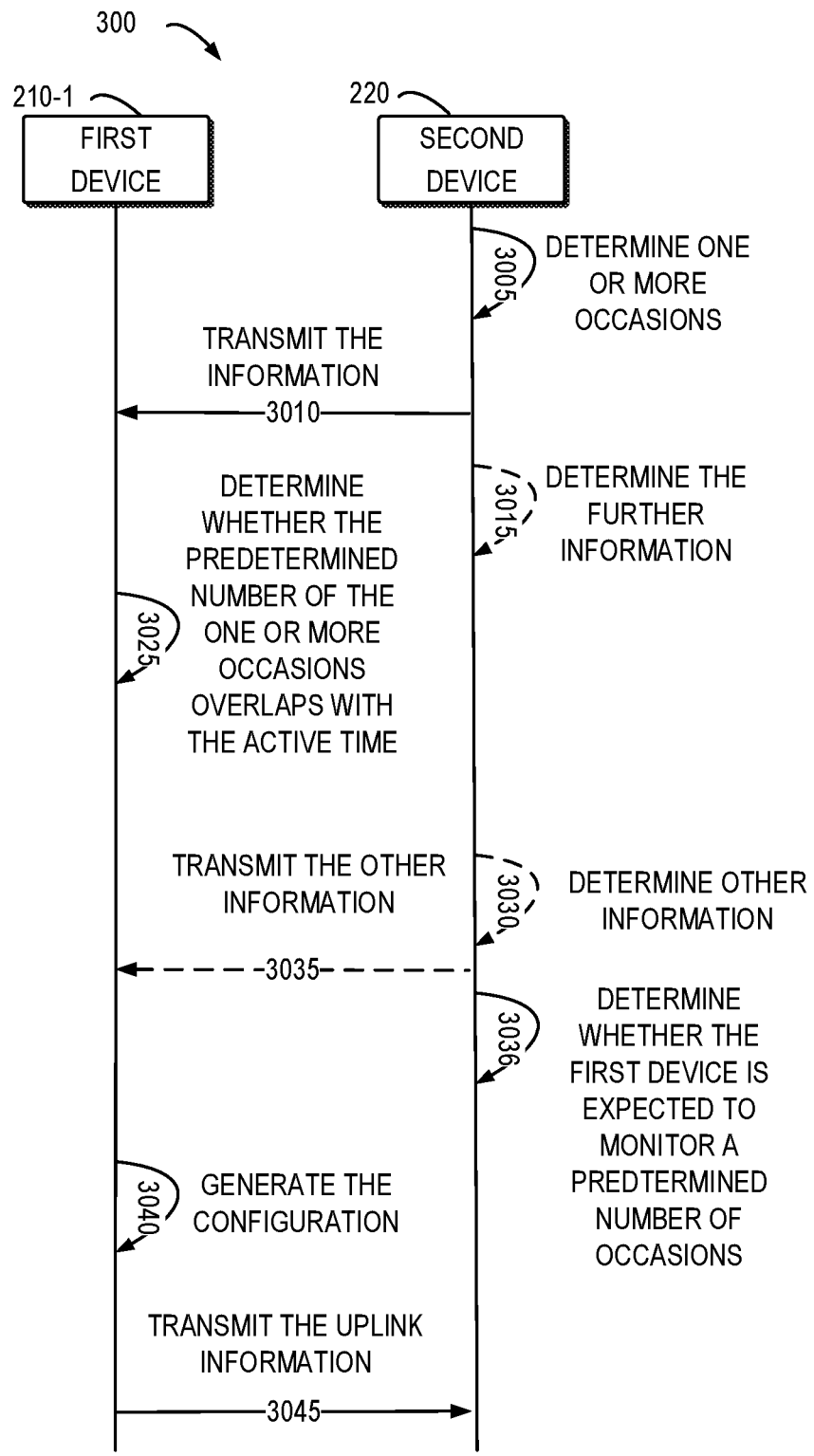
FIG. 3 illustrates a schematic diagram of interactions between devices according to according to some embodiments of the present disclosure.

FIG. 3 illustrates a schematic diagram of interactions 300 among devices in accordance with some embodiments of the present disclosure. The interactions 300 may be implemented at any suitable devices. Only for the purpose of illustrations, the interactions 300 are described to be implemented at the first device 210-1 and the second device 220.

Figure 4:
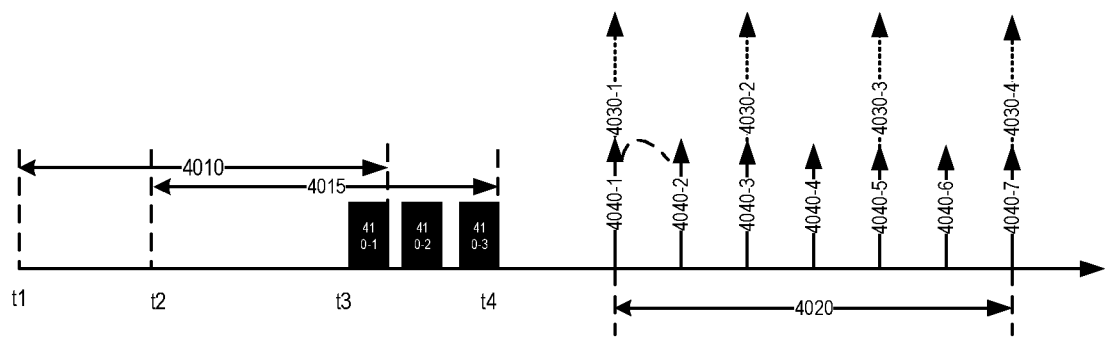
FIG. 4 illustrates a schematic diagram of a discontinuous reception (DRX) cycle according to embodiments of the present disclosure.

The second device 220 determines 3005 one or more occasions configured for detection of physical downlink control channel (PDCCH) transmission carrying a wake-up indication. In an embodiment there is only one occasion. In an embodiment, there are plurality of occasions. The PDCCH transmission may be addressed to a specific radio network temporary identifier. In some embodiments, the PDCCH transmission may be addressed to a power saving radio network temporary identifier (PS-RNTI). As shown in FIG. 4, the second device 220 may determine the plurality of occasions comprising the occasion 410-1, the occasion 410-2 and the occasion 410-3. It should be noted that the number of occasions for monitoring the wake-up signals can be any suitable number. In an example embodiment, the second device 220 and the first device 210-1 may be configured with a short DRX cycle. Alternatively or in addition, the second device 220 and the first device 210-1 may be configured with a long DRX cycle.

The second device 220 transmits 3010 the information indicating the one or more occasions to the first device 210-1. In some embodiments, the information may be transmitted via physical layer (PHY) signaling. Alternatively or in addition, the information may be transmitted via MAC signaling. In other embodiments, the information may be transmitted via RRC signaling. In some embodiments, the information indicating the one or more occasions may also comprise a predetermined time duration 4010 or 4015 of FIG. 4. Detailed description of the time duration will be discussed later.

The second device 220 may determine 3015 further information indicating whether a predetermined number of the one or more occasions 410 is within the time duration. In one example embodiment, the second device 220 may configure or specify whether the first device 210-1 shall take into account all the occasions or only subset of them, i.e. determine what the predetermined number of the one or more occasions is. This may depend e.g. on whether the information in the occasions is the same or whether it may be different, for example. As shown in FIG. 4, the plurality of occasions 410 are out of the time duration 4010 but within the time duration 4015.

The first device 210-1 determines 3025, based on transmission information available at a first time point, whether the predetermined number of the one or more occasions overlaps with active time of the first device 210-1. The predetermined number can be any suitable integer number, for example, 1, 2, . . . , or the total number of the one or more occasions. In some embodiments, the predetermined number of the one or more occasions may be determined based on a configuration from the second device 220. Alternatively or in addition, the predetermined number of the one or more occasions may be determined based on whether the information transmitted in the one or more occasions is the same or may be different. In other embodiments, the predetermined number of the one or more occasions may be a pre-determined value.

The active time comprises at least one of: Active Time associated a discontinuous reception (DRX) cycle, a bandwidth part switch gap, or a measurement gap. For example, as shown in FIG. 4, if the first device 210-1 would like to determine whether the first device 210-1 is expected to monitor the plurality of occasion before/at the time point t3, the first device 210 may make the determination at the time point t1. As shown in FIG. 4, the time point t1 is the time duration 4010 ahead of the time point t3. As another example, as shown in FIG. 4, if the first device 210-1 would like to determine whether the first device 210-1 is able to monitor the plurality of occasion before/at the time point t4, the first device 210 may make the determination at the time point t2. As shown in FIG. 4, the time point t2 is the time duration 4015 ahead of the time point t4. As mentioned above, the time duration may be configured by the second device 220. Alternatively or in addition, the time duration may be predefined and be, e.g., 4 milliseconds. This time duration may correspond to the ambiguity period discussed earlier. In an embodiment, the time duration may be determined to start at the reception of the signaling that indicates the first device to end the active time of the first device.

In some embodiments, the transmission information available at the first time point (or second time point in the other non-limiting example) comprises at least one of the following: a grant (or an uplink grant), an assignment (or a downlink assignment), a DRX command MAC CE, a long DRX command MAC CE, and a scheduling request.

In an example embodiment, the first device 210-1 may determine whether the first device 210-1 is in active time based the transmission information available at the first time point. For example, the first device 210-1 may be in DRX active time. For example, the first device 210-1 may be in a measurement gap. Alternatively or in addition, the first device 210-1 may in a BWP switching gap.

If the first device 210-1 is in active time, the first device 210-1 may determine to skip monitoring the plurality of occasions 410. Alternatively, if the first device 210-1 is not in active time, the first device 210-1 may determine to monitor the plurality of occasions 410.

The second device 220 may determine 3030 other information indicating that whether the information transmitted in the one or more occasions is the same. The second device 220 may transmit 3035 the other information to the first device 210-1. In some embodiments, the other information may be transmitted via PHY signaling. For example, the PHY signaling may be downlink control information or the wake-up signal. Alternatively or in addition, the information may be transmitted via MAC signaling, for example, MAC CE. In other embodiments, the information may be transmitted via RRC signaling, for example, RRCReconfiguration or system information. The second device 220 may transmit the wake-up signals to the first device 210-1.

The second device 220 determines 3036 whether the first device is expected to monitor a predetermined number of the one or more occasions between a first time point and another time point (for example, the time points t1 and t3). The determination 3036 is based on transmission information associated with the first device and available at the first time point. The time point t1 (or t2, depending on the embodiment) may be seen as the decision point on how to determine uplink reporting for the next DRX onDuration. For example, the first device 210-1 may determine at this point how many, if any, of the DCP occasions are configured to take place before time point t3, which is ending the ambiguous activity time of the first device.

The first device 210-1 generates 3040 the configuration for transmitting an uplink information based on the determination 3025. The first device 210-1 transmits 3045 the uplink information to the second device 220, for example, in the drx-onDuration timer duration 4020. The further time point may be, for example, during the DRX on duration timer running or in next DRX cycle. Thus, the further time point may be a predetermined time interval that takes place after the ambiguity period, i.e. after any overlapping occasion(s). For example, the uplink information may be a CSI report. Alternatively or in addition, the uplink information may be a sounding reference signal (SRS). It should be noted that the uplink information can be any kinds of suitable uplink information.

In some embodiments, if the first device is in active time or BWP switching gap when the DCP occasions take place, the first device 210-1 may determine a first configuration associated with the discontinuous transmission on duration timer is running. The first device 210-1 may transmit the uplink information based on the first configuration. As shown in FIG. 4, in the drx-onDuration timer duration 4020, the occasions 4040-1, 4040-2, 4040-3, 4040-4, 4040-5, 4040-6 and 4040-7 are configured for the transmitting uplink information when on duration timer is running.

In some embodiments, if the ambiguity period is over when the DCP occasions take place, the first device 210-1 may try to monitor the one or more occasions. If the first device 210-1 cannot detect wake-up signal/indication (i.e. cannot detect PDCCH transmission on the non-overlapping occasions), the first device 210-1 may determine a second configuration associated with the discontinuous reception on duration timer not being running. The first device 210-1 may transmit the uplink information based on the second configuration. As shown in FIG. 4, in the drx-onDuration timer duration 4020, the occasions 4030-1, 4030-2, 4030-3 and 4030-4 are configured for the uplink information when on duration timer is not running.

In an example embodiment, if the information 3010 indicates that the one or more occasions 410 is within a time duration between the first time point and a further time point (for example, t3), the first device 210-1 may determine the first configuration associated with the discontinuous transmission on duration timer is running. The first device 210-1 may transmit the uplink information based on the first configuration. In some embodiments, the first device 210-1 may determine to start the on duration timer.

In an example embodiment, if the information transmitted in the one or more occasions is allowed to be different and that the predetermined number of the plurality of occasions 410 overlap with active time, the first device 210-1 may determine a first configuration associated with the discontinuous reception on duration timer is running. The first device 210-1 may transmit the uplink information based on the first configuration.

In some embodiments, if the first device 210-1 is expected to monitor the predetermined number of the one or more occasions, the first device 210-1 may detect the wake-up signals during the predetermined number of the plurality of occasions 410. If the first device 210-1 is able to decode the detected wake-up signal, the first device 210-1 may transmit the uplink information based on the wake-up signals. For example, the first device 210-1 may not be in active time/measurement gap/BWP switching and cannot receive further scheduling (for example, DRX command MAC CE is received by the first device 210-1), the first device 2101 may transmit the uplink information based on the DCP decoding itself.

In other embodiments, if the predetermined number of the one or more occasions does not overlap with active time of the first device 210-1, the first device 210-1 may detect PDCCH transmission carrying the wake-up indication/the wake-up signals during the predetermined number of the one or more occasion. The first device 210-1 may detect wake-up signals during the at least one occasion and may transmit the uplink information to the second device based on the detected wake-up signals. In some embodiments, if the first device 210-1 is unable to decode the wake-up signal/the wake-up indication in PDCCH transmission, the first device 210-1 may determine to start a DRX on duration timer and transmit the uplink information based on the first configuration associated with a DRX on duration timer being running.

Alternatively or in addition, if the information transmitted in the predetermined number of the one or more occasions is the same and that at least one of the plurality of occasions is out of a time duration between the first time point and another time point (e.g. t3 shown in FIG. 4), i.e. outside the ambiguous active time of the first device 210-1), meaning that the at least one of the plurality of occasions are not overlapping with the active time, the first device 210-1 may detect the non-overlapping wake-up signals after the ambiguity period and before the DRX onDuration. The first device 210-1 may decode the detected wake-up signals during the at least one occasion and may transmit the uplink information to the second device based on the wake-up signals.

Table 1 below shows an example proposal for the MAC running CR on power saving. It should be noted that the proposal shown in Table 1 is only an example.

Table 1

---

1>if the Short DRX Cycle is used, and [(SFN x 10) + subframe number] modulo (drx-ShortCycle) = (drx-StartOffset) modulo (drx-ShortCycle):
   2>start drx-onDurationTimer after drx-SlotOffset from the beginning of the subframe.
1>if the Long DRX Cycle is used, and [(SFN x 10) + subframe number] modulo (drx-LongCycle) = drx-StartOffset:
   2>if DCP is configured for the active DL BWP:
      3> if DCP is configured and DCP associated with the current DRX Cycle indicated
         to start drx-onDurationTimer, as specified in TS 38.213 [6]; or:
      3>if all DCP occasions in time domain, as specified in TS 38.21x3 [xx6],
         associated with the current DRX Cycle occurred in Active Time considering
         grants/assignments/DRX Command MAC CE/Long DRX Command MAC CE
         received and Scheduling Request sent until time_offset prior to start of the last
         DCP occasion, or within BWP switching interruption length, or during a
         measurement gap; or (ALTERNATIVE:)
      3>if a DCP occasion in time domain, as specified in TS 38.21x3 [xx6], associated
         with the current DRX Cycle occurred in Active Time considering
         grants/assignments/DRX Command MAC CE/Long DRX Command MAC CE
         received and Scheduling Request sent until time_offset prior to start of the first
         DCP occasion, or within BWP switching interruption length, or during a
         measurement gap; or
      3>if ps-Wakeup is configured with value true and DCP associated with the current
         DRX Cycle has not been received:
         4>start drx-onDurationTimer after drx-SlotOffset from the beginning of the
            subframe.
   2>else:
      3>start drx-onDurationTimer after drx-SlotOffset from the beginning of the
         subframe.
. . .
1>if DCP is configured and the drx-onDurationTimer is not started associated with the
   current DRX Cycle as specified above in this clause; and
1>if in current symbol n, drx-onDurationTimer would be otherwise running; and
1>if ps-Periodic_CSI_Transmit is configured with value true:
   2>not transmit periodic SRS and semi-persistent SRS defined in TS 38.214 [7];
   2>report periodic CSI on PUCCH.
1>else if in current symbol n, if the MAC entity would not be in Active Time
   considering grants/assignments/DRX Command MAC CE/Long DRX Command
   MAC CE received and Scheduling Request sent until 4 ms prior to symbol n when
   evaluating all DRX Active Time conditions as specified in this clause as well as the
   DCP reception associated with this DRX Cycle:
   2>not transmit periodic SRS and semi-persistent SRS defined in TS 38.214 [7];
   2>if ps-Periodic_CSI_Transmit is not configured with value true; or
   2>if DCP is not configured:
      3>not report CSI on PUCCH and semi-persistent CSI on PUSCH;
   2>else:
      3>monitor DCP as specified in TS38.213[6].
1>if CSI masking (csi-Mask) is setup by upper layers:
   2>in current symbol n, if drx-onDurationTimer would not be running considering
      grants/assignments/DRX Command MAC CE/Long DRX Command MAC CE received until 4 ms prior to symbol n when evaluating all DRX Active Time conditions as specified in this clause as well as the DCP associated with this DRX Cycle:
2>if ps-Periodic_CSI_Transmit is not configured with value true; or
2>if if DCP is not configured:
   3>not report CSI on PUCCH.

For example, if the first device 210-1 is active at point t1 and receives from the second device, for instance, a DRX command MAC CE to end the active time, the ambiguity period may last until the time point t3 (e.g. 4 ms). The configuration information received in step 3010 may show that all or a subset (e.g. a predetermined number) of occasions may overlap this ambiguity period. As such, the second device 210 cannot be sure if the first device 210-1 will monitor the overlapping occasions. To be on the safe side, both devices may assume that the overlapping occasions are not monitored.

In one embodiment, if all the occasions overlap the ambiguity period (also called active time of the first device, expected activity time of the first device, or ambiguous activity time of the first device), then the first device 210-1 may determine to skip monitoring the overlapping occasions and determine to start the DRX onDurationTimer and report CSI (or other uplink signaling) according to a certain configuration (e.g. a first configuration).

On the other hand, if none of the occasions overlap with the ambiguity period, then the first device 210-1 may monitor the occasions. If the first device 210-1 detects a wake-up signal on the occasion(s), then the first device 210-1 may determine to start the DRX onDurationTimer and report CSI (or other uplink signaling) according to the certain configuration (e.g. the first configuration). If the first device 210-1 does not detect a wake-up signal on the occasion(s), then the first device 210-1 may refrain from starting the drx onDurationTimer and report CSI (or other uplink signaling) according to a different configuration (e.g. a second configuration).

In one embodiment, if a subset of the occasions overlap with the ambiguity time and if the information comprised in the occasions is the same, then the first device 210-1 may monitor the non-overlapping occasion(s). If the first device 210-1 detects a wake-up signal on the non-overlapping occasion(s), then the first device 210-1 may determine to start the DRX onDurationTimer and report CSI (or other uplink signaling) according to the certain configuration (e.g. the first configuration). If the first device 210-1 does not detect a wake-up signal on the non-overlapping occasion(s), then the first device 210-1 may refrain from starting the drx onDurationTimer and report CSI (or other uplink signaling) according to the different configuration (e.g. the second configuration).

In one embodiment, if a subset of the occasions overlap with the ambiguity time and if the information comprised in the occasions may be different (need not be but can be), then the first device 210-1 may determine to skip monitoring of all occasions (the overlapping and non-overlapping), and the first device 210-1 may determine to start the DRX onDurationTimer and report CSI (or other uplink signaling) according to the certain configuration (e.g. the first configuration).

It may also be possible that the first device 210-1 is configured to perform differently based on the detection of the wake-up signal. For example, the first device may, if it does not detect any wake-up signals on non-overlapping occasion(s), determine to start the DRX onDurationTimer and report CSI (or other uplink signaling) according to the certain configuration (e.g. the first configuration).

In an embodiment, the first device 210-1 may make a determination a time_offset (=ambiguity time) before the DCP occasion(s) that the first device 210-1 cannot decode the DCP occasions, in which case the first device 210-1 may start drx-onDurationTimer and base the CSI reporting on the rules when drx-onDurationTimer is started/running.

In an embodiment, the first device 210-1 may make a determination a time_offset (i.e., ambiguity time) before the DCP occasion(s) that the first device 210-1 will not be in active time/measurement gap/BWP switching/etc. preventing to decode the DCP occasion(s). However, the first device 210-1 cannot at this point know if such assumption will hold (e.g., the second device 220 may schedule the first device 210-1 after this point). In this case, the first device 210-1 may assume not to start drx-onDurationTimer and base the CSI reporting on the rules when drx-onDurationTimer is not started/running. In alternative embodiment, the first device 210-1 may assume to start drx-onDurationTimer and base the CSI reporting on the rules when drx-onDurationTimer is started/running.

In an embodiment, the first device 210-1 makes a determination a time_offset (i.e., ambiguity time) before the DCP occasion(s) that the first device 210-1 will not be in active time/measurement gap/BWP switching/etc. preventing to decode DCP occasion(s) and cannot receive further scheduling (e.g., DRX command MAC CE is received by the first device 210-1). In this case the first device 210-1 may base the CSI reporting on the DCP decoding itself, i.e., whether the DCP will start drx-onDurationTimer or not.

Figure 5:
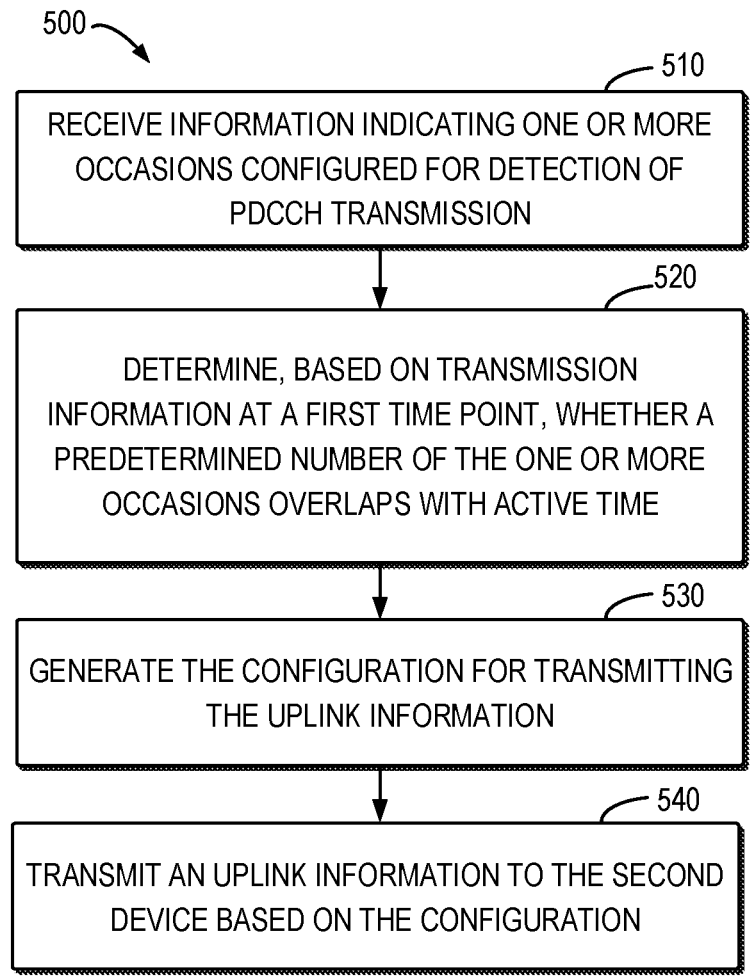
FIG. 5 illustrates a flow chart of a method according to embodiments of the present disclosure.

FIG. 5 illustrates a flow chart of method 500 according to embodiments of the present disclosure. The method 500 can be implemented at any suitable devices. For example, the method may be implemented at the first device 210-1.

At block 510, the first device 210-1 receives the information indicating one or more of occasions for detection of PDCCH transmission carrying a wake-up indication from the second device 220. In some embodiments, the information may be transmitted via PHY signaling. Alternatively or in addition, the information may be transmitted via MAC signaling. In other embodiments, the information may be transmitted via RRC signaling.

At block 520, the first device 210-1 determines based on transmission information available at a first time point, whether a predetermined number of the one or more occasions overlaps with active time of the first device (active time may also be called ambiguous active time or ambiguity time, e.g. between time points t1 and t3, or time point t2 and t4, or between t1 and t4, for example). In some embodiments, the transmission information at the first time point comprises at least one of the following: a grant, an assignment, a received DRX command MAC CE, Long DRX command MAC CE and a scheduling request.

In an example embodiment, the first device 210-1 may determine whether the first device 210-1 is in active time at the first time point based the transmission information. For example, the first device 210-1 may be in a measurement gap. Alternatively or in addition, the first device 210-1 may be in a BWP switching gap.

If the first device 210-1 is in active time, the first device 210-1 may determine to skip monitoring the plurality of occasions 410. Alternatively, if the first device 210-1 is not in active time, the first device 210-1 may determine to monitor the plurality of occasions 410.

At block 530, the first device 210-1 generates the configuration for transmitting an uplink information based on the determination at block 520. For example, the uplink information may be a CSI report. Alternatively or in addition, the uplink information may be a SRS. It should be noted that the uplink information can be any kinds of suitable uplink information.

At block 540, the first device 210-1 transmits the uplink information to the second device 220 based on the configuration (wherein the second time point may be a time interval comprising DRX onduration of a DRX cycle). In some embodiments, if the one or more occasions overlap with the active time of the first device 210-1 (i.e., ambiguity time), the first device 210-1 may determine a first configuration associated with the discontinuous transmission on duration timer is running. The first device 210-1 may transmit the uplink information based on the first configuration. As shown in FIG. 4, in the drx-onDuration timer duration 4020, the occasions 4040-1, 4040-2, 4040-3, 4040-4, 4040-5, 4040-6 and 4040-7 are configured for transmitting the uplink information when onDuration Timer is running/started.

In some embodiments, if the predetermined number of the one or more occasions are not overlapping with active time, the first device 210-1 may monitor wake-up signals during the one or more occasions. If the first device 210-1 cannot detect wake-up signal, the first device 210-1 may not determine to start the DRX timer and determine a second configuration associated with the discontinuous transmission on duration timer is not running/started. The first device 210-1 may transmit the uplink information based on the second configuration. As shown in FIG. 4, during the drx-onDuration timer occasion 4020, the occasions 4030-1, 4030-2, 4030-3 and 4030-4 are configured for transmitting the uplink information when onDuration Timer is not started.

In an example embodiment, if the other information indicates that the predetermined number of the one or more occasions 410 are within a time duration between the first time point and another time point, the first device 210-1 may determine the first configuration associated with the discontinuous transmission on duration timer is started. The first device 210-1 may transmit the uplink information based on the first configuration.

In an example embodiment, if the information transmitted in the predetermined number of the one or more occasion may be different and that the predetermined number of the plurality of occasions 410 are overlapping with the active time of the first device 210-1, the first device 210-1 may determine a first configuration associated with the discontinuous transmission on duration timer is started. The first device 210-1 may transmit the uplink information based on the first configuration.

In some embodiments, if the first device 210-1 is expected to monitor the plurality of occasions, the first device 210-1 may monitor the wake-up signals during the predetermined number of the one or more occasions 410. If the first device 210-1 is able to detect wake-up signal, the first device 210-1 may transmit the uplink information based on the wake-up signals. For example, the first device 210-1 may not be in active time/measurement gap/BWP switching and cannot receive further scheduling (for example, DRX command MAC CE is received by the first device 210-1), the first device 2101 may transmit the uplink information based on the DCP decoding itself.

In other embodiments, if the predetermined number of the one or more occasions does not overlap with the active time, the first device 210-1 may monitor the wake-up signals during the predetermined number of the one or more occasions. The first device 210-1 may detect wake-up signals during the at least one occasion and may transmit the uplink information to the second device based on the wake-up signals.

Alternatively or in addition, if the information transmitted in the one or more occasions is the same and that at least one of the one or more occasions does not overlap with the active time, the first device 210-1 may detect the wake-up signals during the at least one non-overlapping occasions. The first device 210-1 may decode the detected wake-up signals during the at least one non-overlapping occasion and may transmit the uplink information to the second device based on the wake-up signals.

Figure 6:
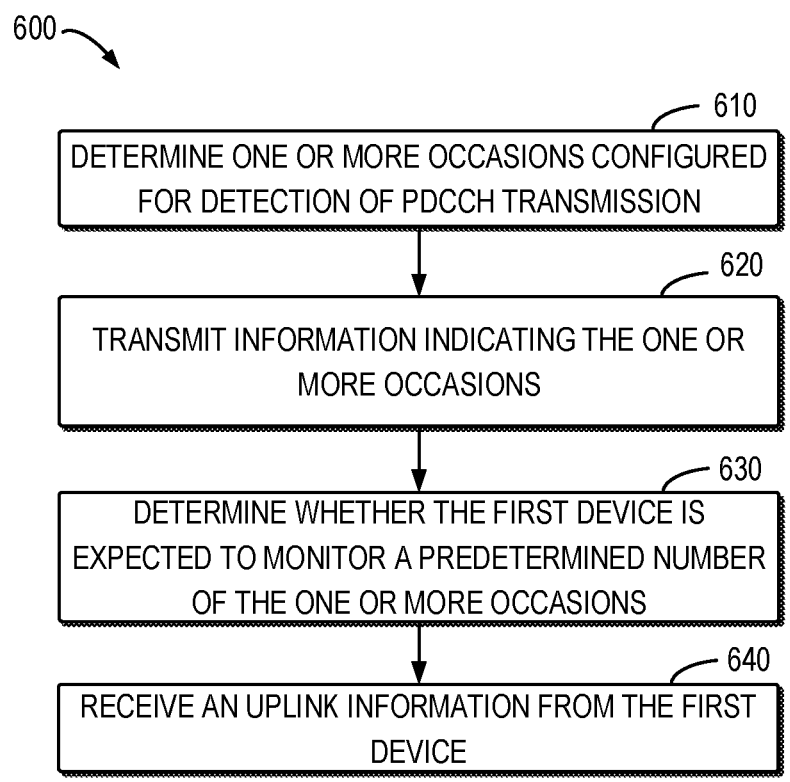
FIG. 6 illustrates a flow chart of a method according to embodiments of the present disclosure.

FIG. 6 illustrates a flow chart of method 600. The method 600 can be implemented at any suitable devices. For example, the method may be implemented at the network device 220.

At block 610, the second device 220 determines one or more occasions configured for detection of PDCCH transmission carrying a wake-up indication. In an example embodiment, the second device 220 and the first device 210-1 may be configured with a short DRX cycle. Alternatively or in addition, the second device 220 and the first device 210-1 may be configured with a long DRX cycle.

At block 620, the second device 220 transmits the information to the first device 210-1. In some embodiments, the information may be transmitted via PHY signaling.

Alternatively or in addition, the information may be transmitted via MAC signaling. In other embodiments, the information may be transmitted via RRC signaling. In some embodiments, the information may also comprise a predetermined time duration.

In some embodiments, the second device 220 may determine further information indicating whether the one or more occasions 410 are within the time duration and may transmit the further information to the first device 210-1. In one example embodiment, the second device 220 may configure or specify whether the first device 210-1 shall take into account all the occasions or only subset of them.

At block 630, the second device 220 determines whether the first device is expected to monitor a predetermined number of the one or more occasions. The determining is based on transmission information associated with the first device at the first time point. In some embodiments, the second device 220 may determine other information indicating that whether information in one or more occasions is the same for the plurality of occasions. The second device 220 may transmit the other information to the first device 210-1. In some embodiments, the other information may be transmitted via PHY signaling. For example, the PHY signaling may be downlink control information or the wake-up signal. Alternatively or in addition, the information may be transmitted via MAC signaling, for example, MAC CE. In other embodiments, the information may be transmitted via RRC signaling, for example, RRCReconfiguration or system information.

At block 640, the second device 220 receives the uplink information from the first device 210-1. For example, the uplink information may be the CSI report. Alternatively or in addition, the uplink information may be the SRS. It should be noted that the uplink information can be any kinds of suitable uplink information.

In some embodiments, if the first device is not expected to monitor the plurality of occasions, the second device 220 may receive the uplink information based on the first configuration. In an example embodiment, if the further information indicates that the plurality of occasions overlaps with the active time of the first device 210-1, the second device 220 may receive the uplink information based on the first configuration.

In some embodiments, if the first device 210-1 is able to monitor the plurality of occasions and cannot decode the detected wake-up signal, the second device 220 may receive the uplink information based on the second configuration associated with the absence of the discontinuous transmission timer.

In an example embodiment, if the information transmitted in the predetermined number of occasions may be different and that the predetermined number of occasions overlap with the ambiguity period, the second device 220 may receive the uplink information based on the first configuration. This may be because if the first device cannot detect all of the wake up signals having different contents, then the first device cannot reliably know how to act during the next on-period merely based on those wake up signals that are after the active time (i.e. ambiguity period).

In some embodiments, if the first device 210-1 is expected to monitor the plurality of occasions and is able to decode the detected wake-up signal, the second device 220 may receive the uplink information based on the decoded wake-up signals.

In other embodiments, if at least one of the plurality of occasions is out of active time and the first device 210-1 may decode the detected wake-up signals during the at least one occasion, the second device 220 may receive the uplink information based on the decoded wake-up signals.

Alternatively or in addition, if the wake-up signals are the same and that at least one of the plurality of occasions is out of active time, the first device 210-1 may decode the detected wake-up signals during the at least one occasion after the active time, in which case the second device 220 may receive the uplink information based on the detected wake-up signals. This may be because even if the first device cannot detect all of the wake up signals, it may be sufficient for the first device to decode the one(s) that is/are after the active time and based on that reliably know how to act during the next on-period.

In embodiments, an apparatus for performing the method 500 (for example, the first device 210-1) may comprise respective means for performing the corresponding steps in the method 500. These means may be implemented in any suitable manners. For example, it can be implemented by circuitry or software modules.

In some embodiments, the apparatus comprises means for receiving, at a first device and from a second device, information indicating one or more occasions configured for detection of physical downlink control channel (PDCCH) transmission carrying a wake-up indication; means for determining, based on transmission information available at a first time point, whether a predetermined number of the one or more occasions overlap with active time; means for generating a configuration for transmitting uplink information based on the determination; and means for transmitting the uplink information to the second device based on the configuration.

In some embodiments, the transmission information available at the first time point comprises at least one of the following: a grant, an assignment, a discontinuous reception (DRX) command medium access control (MAC) control element (CE), a long DRX command MAC CE, and a scheduling request.

In some embodiments, the PDCCH transmission is addressed to a power saving radio network temporary identifier.

In some embodiments, the apparatus further comprises: means for determining at the first time point whether the first device is/will be in active time at the time of the predetermined number of the one or more occasions; means for in accordance with a determination that the first device is/will be in active time, determining to skip monitoring the predetermined number of the one or more occasions; or means for in accordance with a determination that the first device is not/will not be in active time, determining to monitor the predetermined number of the one or more occasions.

In some embodiments, the means for transmitting the uplink information to the second device comprises: means for in accordance with the determination that the predetermined number of the one or more occasions overlap with the active time of the first device, transmitting the uplink information based on a first configuration associated with a discontinuous reception on duration timer being running.

In some embodiments, the means for transmitting the uplink information to the second device comprises: means for in accordance with the determination that the predetermined number of the one or more occasions are not overlapping with the active time of the first device, transmitting the uplink information based on a second configuration associated with a discontinuous reception on duration timer not being running.

In some embodiments, the means for transmitting the uplink information to the second device comprises: means for in accordance with the determination that the predetermined number of the one or more occasions are not overlapping with the active time of the first device, monitoring the PDCCH transmission during the predetermined number of the one or more occasions; means for in accordance with a determination that the first device does not detect the PDCCH transmission carrying the wake-up indication, transmitting the uplink information based on a second configuration associated with a discontinuous reception on duration timer not being running; and means for in accordance with a determination that the first device detects the PDCCH transmission, transmitting the uplink information based on the wake-up indication.

In some embodiments, the means for transmitting the uplink information to the second device comprises: means for in accordance with the determination that the predetermined number of the one or more occasions are not overlapping with the active time of the first device, monitoring the PDCCH transmission during the predetermined number of the one or more occasions; means for in accordance with a determination that the first device is does not detect the PDCCH transmission, determining to start a discontinuous reception on duration timer; means for transmitting the uplink information based on a first configuration associated with a discontinuous reception on duration timer being running; and means for in accordance with a determination that the first device detects the PDCCH transmission the wake-up signal, transmitting the uplink information based on the wake-up indication.

In some embodiments, the means for transmitting the uplink information to the second device comprises: means for in accordance with a determination that information transmitted in the one or more occasions is the same and that at least one of the one or more occasions does not overlap with the active time of the first device, detecting at least one PDCCH transmission during the at least one non-overlapping occasion; and means for transmitting the uplink information to the second device based on the PDCCH transmission.

In some embodiments, the means for transmitting the uplink information to the second device comprises: means for in accordance with a determination that the information transmitted in the one or more occasions is allowed to be different and that the predetermined number of the one or more occasions overlaps with the active time of the first device, transmitting the uplink information based on a first configuration associated with a discontinuous reception on duration timer being running.

In some embodiments, the active time comprises at least one of: Active Time associated a discontinuous reception (DRX) cycle, a bandwidth part switch gap, or a measurement gap.

In some embodiments, the first device comprises a terminal device and the second device comprises a network device.

In embodiments, an apparatus for performing the method 600 (for example, the second device 220) may comprise respective means for performing the corresponding steps in the method 600. These means may be implemented in any suitable manners. For example, it can be implemented by circuitry or software modules.

In some embodiments, the apparatus comprises mean for determining, at a second device, one or more occasions configured for detection of physical downlink control channel (PDCCH) transmission carrying a wake-up indication; means for transmitting to a first device information indicating the one or more occasions; means for determining whether the first device is expected to monitor a predetermined number of the one or more occasions based on transmission information available at the first device at a first time point, wherein the predetermined number of the one or more occasions are after the first time point; and means for receiving uplink information from the first device based on a configuration which is determined based on whether the first device is expected to monitor the predetermined number of the at least one occasion.

In some embodiments, the means for receiving the uplink information from the first device comprises: means for in accordance with a determination that the predetermined number of the one or more occasions overlap with the active time of the first device, receiving the uplink information based on a first configuration associated with a discontinuous reception on duration timer being running.

In some embodiments, the means for receiving the uplink information from the first device comprises: means for in accordance with a determination that the predetermined number of the one or more occasions are not overlapping with the active time of the first device, receiving the uplink information from the first device based on the non-overlapping occasions.

In some embodiments, the means for receiving the uplink information from the first device comprises: means for in accordance with a determination that information transmitted in the one or more occasions is the same and that at least one of the one or more occasions are not overlapping with the active time of the first device, receiving the uplink information from the first device based on the non-overlapping at least one occasion.

In some embodiments, the means for receiving the uplink information from the first device comprises: means for in accordance with a determination that information transmitted in the one or more occasions is allowed to be different and that the predetermined number of the one or more occasions overlaps with the active time of the first device, receiving the uplink information based on a first configuration associated with a discontinuous reception on duration timer being running.

In some embodiments, the means for receiving the uplink information comprises: means for in accordance with the determination that the predetermined number of the one or more occasions are not overlapping with the active time of the first device, receiving the uplink information based on a second configuration associated with a discontinuous reception on duration timer not being running.

In some embodiments, the means for receiving the uplink information comprises: means for in accordance with the determination that the predetermined number of the one or more occasions are not overlapping with the active time of the first device and a determination that the first device does not detect the PDCCH transmission on the non-overlapping occasions, receiving the uplink information based on a second configuration associated with a discontinuous reception on duration timer not being running; and means for in accordance with a determination that the first device detects at least one PDCCH transmission on the non-overlapping occasions, receiving the uplink information based on the detected at least one PDCCH transmission.

In some embodiments, the active time comprises at least one of: Active Time associated a discontinuous reception (DRX) cycle, a bandwidth part switch gap, or a measurement gap.

In some embodiments, the first device comprises a terminal device and the second device comprises a network device.

Figure 7:
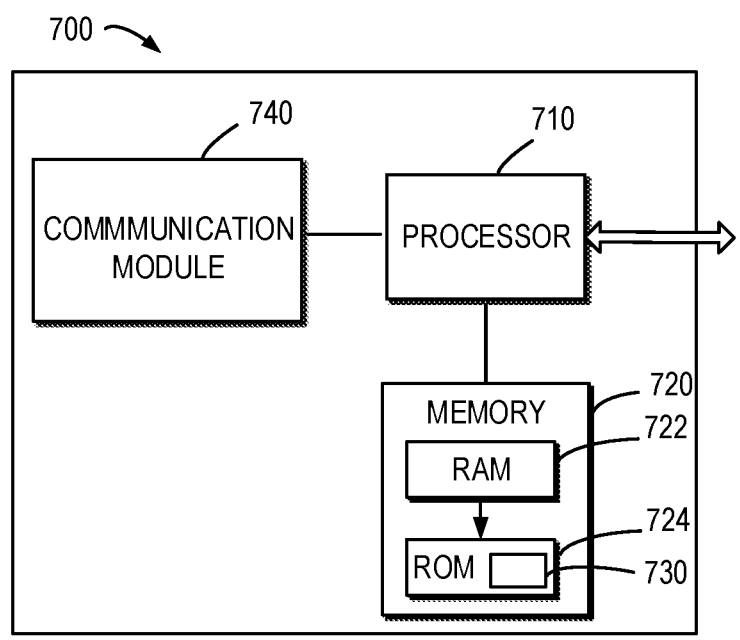
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the first device 110, the second device 220, or the third device 130 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 720 so that the device 700 may perform any process of the disclosure as discussed with reference to FIGS. 2 and 6. The embodiments of the present disclosure may also be implemented by hardware or by a combination of software and hardware.

Figure 8:
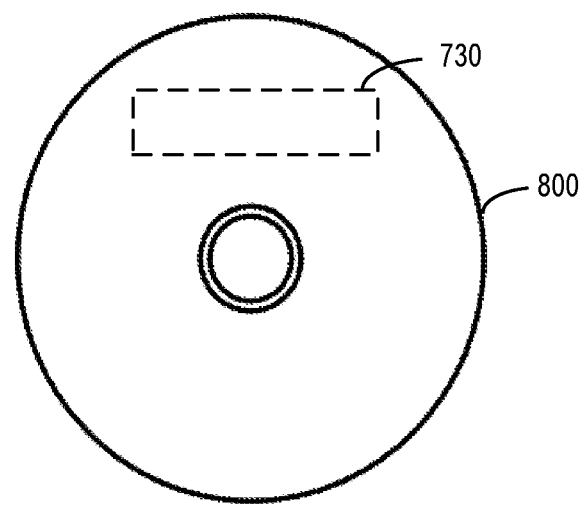
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 700 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 700 may be instead comprised in the distributed unit, and at least some of the described processes may be performed by the distributed unit.

In an embodiment, the execution of at least some of the functionalities of the device 700 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 700 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-600 as described above with reference to FIGS. 4-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
   at least one processor; and
   at least one memory storing instructions that, when executed by the at least one processor, cause the terminal device to perform at least:
   receiving, from a network device, information indicating one or more occasions configured for detection of physical downlink control channel (PDCCH) transmission carrying a wake-up indication;
   determining, based on transmission information available at a first time point, whether a predetermined number of the one or more occasions overlap with an active time of the terminal device, wherein the first time point is 4 ms prior to start of a last occasion of the one or more occasions configured for detection of PDCCH transmission carrying the wake-up indication, wherein the predetermined number of the one or more occasions are after the first time point, and the transmission information available at the first time point comprises at least one of the following: a grant, an assignment, a discontinuous reception (DRX) command medium access control (MAC) control element (CE), a long DRX command MAC CE, and a scheduling request;
   determining a configuration for transmitting uplink information based on the determination of whether the predetermined number of the one or more occasions overlap with the active time of the terminal device; and
   transmitting the uplink information to the network device based on the configuration.

2. The terminal device of claim 1, wherein the PDCCH transmission is addressed to a power saving radio network temporary identifier.

3. The terminal device of claim 1, wherein the instructions, when executed by the at least one processor, further cause the terminal device to perform:
   determining at the first time point whether the terminal device is or will be in active time at the time of the predetermined number of the one or more occasions; and
   in accordance with a determination that the terminal device is or will be in active time, determining to skip monitoring the predetermined number of the one or more occasions; or
   in accordance with a determination that the terminal device will not be or is not in active time, determining to monitor the predetermined number of the one or more occasions.

4. The terminal device of claim 1, wherein the instructions, when executed by the at least one processor, further cause the terminal device to perform:
   in accordance with a determination that the predetermined number of the one or more occasions overlap with the active time of the terminal device, transmitting the uplink information based on a first configuration associated with a discontinuous reception on duration timer being running.

5. The terminal device of claim 1, wherein the instructions, when executed by the at least one processor, further cause the terminal device to perform:
   in accordance with a determination that the predetermined number of the one or more occasions are not overlapping with the active time of the terminal device, transmitting the uplink information based on a second configuration associated with a discontinuous reception on duration timer not being running.

6. The terminal device of claim 1, wherein the instructions, when executed by the at least one processor, further cause the terminal device to perform:
   in accordance with a determination that the predetermined number of the one or more occasions are not overlapping with the active time of the terminal device, monitoring the PDCCH transmission during the predetermined number of the one or more occasions; and
   in accordance with a determination that the terminal device does not detect the PDCCH transmission, transmitting the uplink information based on a second configuration associated with a discontinuous reception on duration timer not being running; or
   in accordance with a determination that the terminal device detects the PDCCH transmission, transmitting the uplink information based on the detected PDCCH transmission.

7. The terminal device of claim 1, wherein the instructions, when executed by the at least one processor, further cause the terminal device to perform:
in accordance with a determination that the predetermined number of the one or more occasions are not overlapping with the active time of the terminal device, monitoring the PDCCH transmission during the predetermined number of the one or more occasions; and
in accordance with a determination that the terminal device does not detect the PDCCH transmission, determining to start a discontinuous reception on duration timer, and transmitting the uplink information based on a first configuration associated with a discontinuous reception on duration timer being running; or
in accordance with a determination that the terminal device detects the PDCCH transmission, transmitting the uplink information based on the detected PDCCH transmission.

8. The terminal device of claim 1, wherein the instructions, when executed by the at least one processor, further cause the terminal device to perform:
in accordance with a determination that information transmitted in the one or more occasions is the same and that at least one of the one or more occasions does not overlap with the active time of the terminal device, detecting at least one PDCCH transmission during the at least one non-overlapping occasion, and transmitting the uplink information to the network device based on the detected at least one PDCCH transmission.

9. The terminal device of claim 1, wherein the instructions, when executed by the at least one processor, further cause the terminal device to perform:
in accordance with a determination that the information transmitted in the one or more occasions is allowed to be different and that the predetermined number of the one or more occasions overlap with the active time of the terminal device, transmitting the uplink information based on a first configuration associated with a discontinuous reception on duration timer being running.

10. The terminal device of claim 1, wherein the predetermined number of the one or more occasions is based on at least one of the following: a configuration from the network device, whether the information in the one or more occasions is the same, whether it is allowed to be different, or a pre-determined value.

11. The terminal device of claim 1, wherein the active time comprises at least one of: active time associated a discontinuous reception cycle, a bandwidth part switch gap, or a measurement gap.

12. A network device comprising:
at least one processor; and
at least one memory storing instructions that, when executed by the at least one processor, cause the network device to perform at least:
determining one or more occasions configured for detection of physical downlink control channel (PDCCH) transmission carrying a wake-up indication;
transmitting, to a terminal device, information indicating the one or more occasions;
determining whether the terminal device is expected to monitor a predetermined number of the one or more occasions based on transmission information available at the terminal device at a first time point, wherein the first time point is 4 ms prior to start of a last occasion of the one or more occasions configured for detection of PDCCH transmission carrying the wake-up indication, wherein the predetermined number of the one or more occasions are after the first time point, and the transmission information available at the first time point comprises at least one of the following: a grant, an assignment, a discontinuous reception (DRX) command medium access control (MAC) control element (CE), a long DRX command MAC CE, and a scheduling request; and
receiving uplink information from the terminal device based on a configuration which is determined based on whether the terminal device is expected to monitor the predetermined number of the at least one occasion.

13. The network device of claim 12, wherein the instructions, when executed by the at least one processor, further cause the network device to perform:
in accordance with a determination that the predetermined number of the one or more occasions overlap with an active time of the terminal device, receiving the uplink information based on a first configuration associated with a discontinuous reception on duration timer being running.

14. The network device of claim 12, wherein the instructions, when executed by the at least one processor, further cause the network device to perform:
in accordance with a determination that the predetermined number of the one or more occasions are not overlapping with the active time of the terminal device, receiving the uplink information from the terminal device based on the non-overlapping occasions.

15. The network device of claim 12, wherein the instructions, when executed by the at least one processor, further cause the network device to perform:
in accordance with a determination that information transmitted in the one or more occasions is the same and that at least one of the one or more occasions are not overlapping with the active time of the terminal device, receiving the uplink information from the terminal device based on the non-overlapping at least one occasion.

16. The network device of claim 12, wherein the instructions, when executed by the at least one processor, further cause the network device to perform:
in accordance with a determination that information transmitted in the one or more occasions is allowed to be different and that the predetermined number of the one or more occasions overlap with the active time of the terminal device, receiving the uplink information based on a first configuration associated with a discontinuous reception on duration timer being running.

17. The network device of claim 12, wherein the instructions, when executed by the at least one processor, further cause the network device to perform:
in accordance with a determination that the predetermined number of the one or more occasions are not overlapping with the active time of the terminal device, receiving the uplink information based on a second configuration associated with a discontinuous reception on duration timer not being running.

18. A method comprising:
receiving, at a terminal device from a network device, information indicating one or more occasions configured for detection of physical downlink control channel (PDCCH) transmission carrying a wake-up indication;
determining, based on transmission information available at a first time point, whether a predetermined number of the one or more occasions overlap with an active time of the terminal device, wherein the first time point is 4 ms prior to start of a last occasion of the one or more occasions configured for detection of PDCCH transmission carrying the wake-up indication, wherein the predetermined number of the one or more occasions are after the first time point, and the transmission information available at the first time point comprises at least one of the following: a grant, an assignment, a discontinuous reception (DRX) command medium access control (MAC) control element (CE), a long DRX command MAC CE, and a scheduling request;

determining a configuration for transmitting uplink information based on a determination of whether the predetermined number of the one or more occasions overlap with the active time of the terminal device; and transmitting the uplink information to the network device based on the configuration.

* * * * *

UNITED STATES PATENT AND TRADEMARK OFFICE
CERTIFICATE OF CORRECTION

PATENT NO. : 11,997,605 B2
APPLICATION NO. : 17/168270
DATED : May 28, 2024
INVENTOR(S) : Samuli Turtinen et al.

Page 1 of 1

It is certified that error appears in the above-identified patent and that said Letters Patent is hereby corrected as shown below:

On the Title Page

Column 1, item (30), Foreign Application Priority Data, Line 1, delete "(WO)" and insert -- (CN) --, therefor.

In the drawing, under item (58) & (57), reference numeral 3036, Line 6, delete "PREDTERMINED" and insert -- PREDETERMINED --, therefor.

In the Drawings

In sheet 3 of 8, FIG. 3, reference numeral 3036, Line 6, delete "PREDTERMINED" and insert -- PREDETERMINED --, therefor.

In the Claims

In Column 24, Lines 9-10, Claim 1, delete "occassions" and insert -- occasions --, therefor.

In Column 26, Line 61, Claim 18, delete "device" and insert -- device, --, therefor.

Signed and Sealed this
Eleventh Day of February, 2025

Coke Morgan Stewart
*Acting Director of the United States Patent and Trademark Office*